June 5, 1923.
A. W. MORSE
BURNER
Filed Sept. 23, 1920
1,457,849
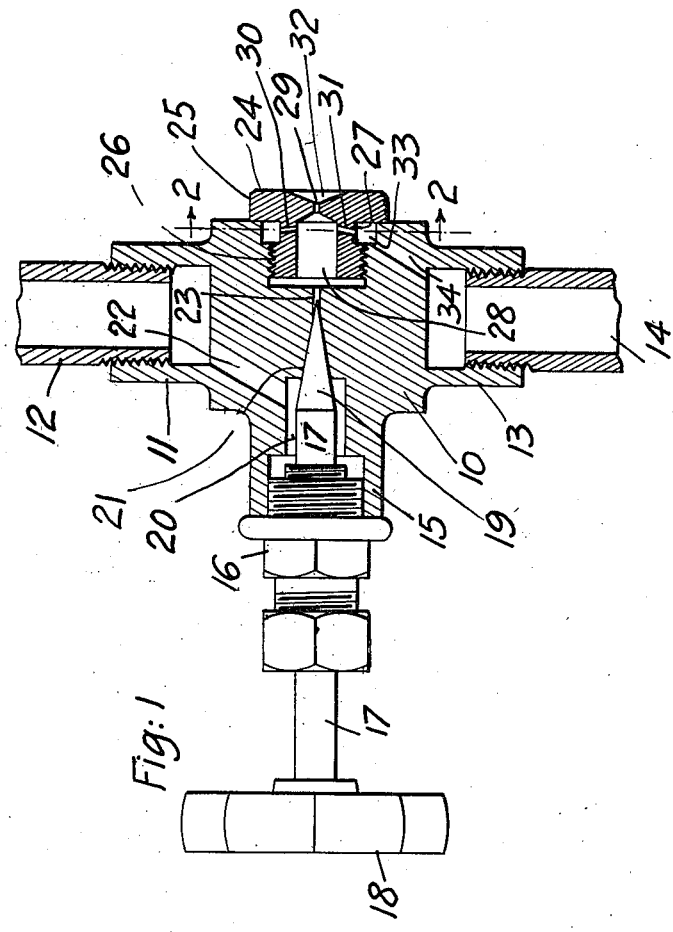
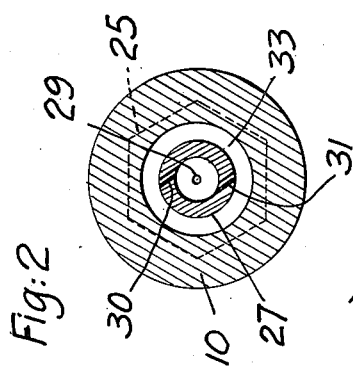
Albert W. Morse
INVENTOR.
BY Walter E. Wollheim
ATTORNEY.

Patented June 5, 1923.

1,457,849

UNITED STATES PATENT OFFICE.

ALBERT W. MORSE, OF FOREST HILLS, NEW YORK.

BURNER.

Application filed September 23, 1920. Serial No. 412,120.

*To all whom it may concern:*

Be it known that I, ALBERT W. MORSE, a citizen of the United States, and a resident of Forest Hills, in the county of Queens and State of New York, have invented certain new and useful Improvements in Burners, of which the following is a specification.

This invention relates to improvements in fuel burners, which are adapted to burn a mixture of atomized oil and air or a suitable gas mixed with air, or powdered coal or similar fuel, and it is one of the objects to provide a burner of this kind which is particularly adapted for use where only a small amount of heat is required and where a burner of very small capacity is a necessity. Another object is to provide a burner of this kind which has a minimum number of parts, and which can be used for either oil or gas, or powdered coal, in conjunction with air, or steam, if preferred. Other objects will appear in the following specification in which a preferred form of my fuel burner is disclosed, especially applicable for use in connection with oil burning systems.

The invention is illustrated by means of the accompanying drawings, in which—

Fig. 1 is a vertical longitudinal sectional view through the burner; and

Fig. 2 is a cross sectional view along the plane of line 2—2 in Fig. 1.

Like characters of reference denote similar parts throughout the several views and the following specifications.

10 is a body of the burner. 11 is a tubular extension on one side of the body 10 threaded to receive an oil pipe 12. The opposite end of body 10 is provided with a similar extension 13 threaded for an air pipe 14. Centrally between these extensions, body 10 is extended at 15 to receive a screw bonnet 16 into which a spindle 17 can be reciprocated. 18 is a suitable hand wheel affixed to the outer end of spindle 17. The innermost end of spindle 17 is provided with a long taper 19. 20 is a small chamber surrounding the spindle 17 just ahead of its tapered end 19 which is adapted to seat against the body at 21. 22 is a passage connecting chamber 20 with the oil supply pipe 12. 23 is a very small orifice, controlled by tapered end 19 of spindle 17. Screwed into the body opposite bonnet 16 and spindle 17, but in co-axial alignment therewith, is a plug 24. Plug 24 is provided with a flange 25 of polygonal shape to make a joint with the body 10. 26 is a threaded part of plug 24 to engage a correspondingly threaded portion within body 10. The part of the plug 24 which is between flange 25 and threaded part 26 is of reduced diameter at 27. 28 is a hollow central chamber of plug 24 into which terminates orifice 23. 29 is an outlet opening from chamber 28 through plug 24. 30 and 31 are ducts through the reduced portion 27 of the plug terminating in the central chamber 28, and so positioned as to impinge the circumference of the central chamber 28 tangentially, as shown in Fig. 2. Outlet orifice 29 is chamfered at 32, the outlet opening 29 being its apex. 33 is an annular chamber in body 10 surrounding the reduced part 27 of plug 24. 34 is a duct connecting chamber 33 with the air supply pipe 14.

The operation of the device is as follows:

Oil is admitted under pressure through supply pipe 12 whence it passes through passage 22 into the chamber 20 and through valve controlled opening 23 into central chamber 28. There it mixes with air admitted through pipe 14, duct 34 and tangential orifices 30 and 31. By means of the tangential direction of orifices 30 and 31 the air is given a whirling motion within chamber 28, thereby thoroughly mixing with the oil and imparting its velocity thereto. Oil and air are then discharged in form of a vapor or mist from the final outlet 29.

This device can be used for either gas or powdered fuel by simply bringing a gas or powdered fuel line to the oil supply pipe and installing proper operating valves. In conjunction therewith, steam, of course, can also be used in place of air. The functioning of the device in either case is the same as described above.

It is understood that various changes in the form, proportion and minor details of construction may be resorted to without departing from the principle or sacrificing any of the advantages of the invention, as defined in the appended claims.

What I claim as new, is:

1. In a fuel burner, the combination of a body casing having a fuel connection and an air connection, a regulating valve for the fuel, a discharge nozzle, consisting of a single unit of substantially cylindrical shape screwed into the said body casing and having an open chamber facing the said regulating valve at one end, and a small outlet opening at the other end, and orifices through the wall of the chamber to admit air into said chamber substantially tangent to the wall thereof, to cause the air and fuel to whirl in the said chamber towards the outlet of the said nozzle, and ducts within the casing connecting the said air connection with the said orfices.

2. A fuel burner comprising in combination a body casing having a fuel connection at one end and an air connection at the other end, a fuel regulating valve interposed between the said connections, a discharge nozzle consisting of a single unit of substantially cylindrical shape screwed into the body casing and having an open chamber at the end nearest the said regulating valve and a small outlet opening at its other end, orifices through the walls of the said chamber and substantially tangent to the walls thereof and in angular relation to its longitudinal axis, an annular chamber in the body casing surrounding the outer terminals of the said orifices, and a passage between the said annular chamber and the air connection.

In testimony whereof I have hereunto set my hand and seal in presence of two subscribing witnesses.

ALBERT W. MORSE. [L. S.]

Witnesses:
M. CHURCHILL,
H. PENDLETON.